United States Patent
Nakatsugawa

(10) Patent No.: US 6,754,719 B1
(45) Date of Patent: Jun. 22, 2004

(54) FUNCTIONAL ELECTRONIC APPLIANCES NETWORK SYSTEM

(75) Inventor: Yoshinori Nakatsugawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 545 days.

(21) Appl. No.: 09/095,663

(22) Filed: Jun. 11, 1998

(30) Foreign Application Priority Data

Jun. 12, 1997 (JP) ............................................. 9-155256

(51) Int. Cl.$^7$ ......................... G06F 15/16; H04L 12/28
(52) U.S. Cl. ...................... 709/251; 370/222; 370/257; 370/404
(58) Field of Search .................. 348/14, 552; 709/253, 709/251; 370/395, 463, 222, 403, 224, 452, 257, 404; 714/712; 725/98

(56) References Cited

U.S. PATENT DOCUMENTS

| | | | | |
|---|---|---|---|---|
| 5,438,325 A | * | 8/1995 | Nishigaki et al. | 340/825.24 |
| 5,473,317 A | * | 12/1995 | Inomata et al. | 340/825.25 |
| 5,544,153 A | | 8/1996 | Marttinen | 370/16.1 |
| 5,650,775 A | * | 7/1997 | Van Steenbrugge | 340/825.24 |
| 5,784,581 A | * | 7/1998 | Hannah | 710/110 |
| 5,890,015 A | * | 3/1999 | Garney et al. | 395/882 |
| 5,898,831 A | * | 4/1999 | Hall et al. | 395/187.01 |

FOREIGN PATENT DOCUMENTS

| | | | | |
|---|---|---|---|---|
| EP | 0 467 587 A2 | 4/1988 | | H04B/1/20 |
| EP | 0 406 486 | 1/1991 | | |
| EP | 0 406 486 A1 | 1/1991 | | G08C/19/28 |
| EP | 0 467 587 | 1/1992 | | |
| EP | 0 467 587 A3 | 1/1992 | | H04B/1/20 |
| JP | 3-44294 | 2/1991 | | |

* cited by examiner

*Primary Examiner*—Jack B. Harvey
*Assistant Examiner*—Beatriz Prieto
(74) *Attorney, Agent, or Firm*—Oblon, Spivak, McClelland, Maier & Neustadt, P.C.

(57) ABSTRACT

Disclosed is an information network system which comprises a plurality of functional appliances, a plurality of relaying appliances each provided with respect to its corresponding functional appliance, a data transfer path for enabling the relaying appliances to be communicated with each other, an operation part for selecting a desired one from among the functional appliances so as to select a desired function from among a plurality of functions of the selected functional appliance, and a command conversion part provided between a predetermined one of the functional appliances and the relaying appliance corresponding thereto and having a command conversion table having stored therein function commands corresponding to the functions of the functional appliances. The relaying appliance can transmit the data from the functional appliance corresponding thereto to the data transfer path and receive the data from the functional appliance other than that corresponding thereto through the data transfer path, and the command conversion part reads out the function command corresponding to the function of the functional appliance selected using the operation part by referring to the command conversion table.

10 Claims, 2 Drawing Sheets

FIG. 2

| PLAY | A TYPE | CD B TYPE | C TYPE | A TYPE | DVD B TYPE | C TYPE |
|------|--------|-----------|--------|--------|------------|--------|
| STOP | CP1    | CP2       | CP3    | DP1    | DP2        | DP3    |
| ---  | CS1    | CS2       | CS3    | DS1    | DS2        | DS3    |
| ---  | ---    | ---       | ---    | ---    | ---        | ---    |

FUNCTIONAL ELECTRONIC APPLIANCES NETWORK SYSTEM

BACKGROUND OF THE INVENTION

1. Field of the Invention

The present invention relates to an information network system for causing communications to be made between a plurality of functional appliances connected to data transfer paths and, more particularly, to the information network system which is simple in construction and convenient to use.

2. Description of the Related Art

Generally, in an information network system, there is adopted a construction wherein a plurality of functional appliances are connected to data transfer paths and communications are made between the plurality of functional appliances through the data transfer paths.

And, when controlling the operation and stop of a functional appliance from another functional appliance, transmission/reception of a command are performed between these a functional appliances.

More specifically, in the above-described information network system, a plurality of route hubs are provided and these route hubs are connected to one another by the data transfer paths in the form of a ring. And communications are performed between these route hubs.

A more specific explanation will now be given of the above-described construction by taking as a representative example a construction wherein a first to a fourth route hub are provided.

First, a first node is connected to the first route hub through a common command conversion part. It is assumed that this first node is used as a human interface (hereinafter referred to as "HI").

The HI alternatively selects a CD and DVD as later described and transmits thereto a HI command that corresponds to "PLAY", "STOP" or the like of the selected CD or DVD.

Subsequently, the common command conversion parts converts the HI command sent from the HI to a common command which has been made common regarding the operation contents such as PLAY or STOP for each functional appliance such as CD or DVD irrespective of the maker, type and the like. It is to be noted that such common command is determined for each function.

And this HI has a switching function for switching the data transfer path.

Next, a second node is connected to the second route hub. It is assumed that this second node is used as a compact disk (hereinafter referred to as "CD") which is a functional appliance.

This CD transmits CD data as the source data to the second route hub. A first mutual conversion part is provided between the CD and the second route hub.

Next, a third node is connected to the third route hub. It is assumed that this third node is used as a digital video disk (called also a digital versatile disk and hereinafter referred to as "DVD") which is a functional appliance.

This DVD transmits DVD video data and audio data as the source data to the third route hub. And a second mutual conversion part is provided between the DVD and the third route hub.

And a fourth and a fifth node are connected to the fourth route hub. This fourth node is assumed as a monitor which is a functional appliance and the fifth node is assumed as a speaker (including an amplifier) which is a functional appliance.

This monitor receives the DVD video data from the fourth route hub. And a third mutual conversion part is provided between the monitor and the fourth hub.

Also, the speaker receives the CD audio data and DVD audio data from the fourth route hub. And a fourth mutual conversion part is provided between the speaker and the fourth route hub.

It is to be noted that each of the first to the fourth mutual conversion part converts the function command from its own node to a common command and transmits the common command obtained by conversion to its own route hub.

Also, each of the first to the fourth mutual conversion part converts the common command from its own route hub to a function command and transmits the function command obtained by conversion to its own node.

In the above-constructed information network system, when the HI has selected, for example, the DVD and has selected "PLAY", the HI command having these selected contents is sent to the common command conversion part by which the HI command is converted to the common command.

And the first route hub transmits this common command to the third route hub through the data transfer paths and the third route hub receives this common command and its corresponding second mutual conversion part converts the common command to the function command and then sends it to the DVD.

Accordingly, the DVD can be PLAYed.

However, in such a case, in the common command conversion part of the transmission side HI, the HI command should be converted to the common command and, in the mutual conversion part of the reception side DVD, the common command should be converted to the function command.

Namely, the use of the common command conversion part and mutual conversion part is needed for the purpose of controlling the operation and stop of a certain functional appliance. This makes the information network system complex.

SUMMARY OF THE INVENTION

An object of the present invention is to provide an information network system which is simple in construction, inexpensive and convenient to use.

To attain the above object, the information network system according to the present invention comprises a plurality of functional appliances, a plurality of relaying appliances provided respectively with respect to the plurality of functional appliances, a data transfer path for enabling the plurality of relaying appliances to be communicated with each other, an operation unit or part for selecting a desired functional appliance from among the plurality of functional appliances so as to select a desired function from among a plurality of functions of the selected functional appliance, and a command conversion part provided between a predetermined functional appliance of the plurality of functional appliances and the relaying appliance corresponding to the predetermined functional appliance and having a command conversion table having stored therein function commands corresponding to the functions of the plurality of functional appliances.

Here, the relaying appliance can transmit the data from the functional appliance corresponding to this relaying appliance to the data transfer path and can receive the data from the functional appliance other than that corresponding to the relaying appliance through the data transfer path.

And, the command conversion part reads out the function command corresponding to the function of the functional appliance selected using the operation part by referring to the command conversion table.

Namely, in the above-described construction, there is provided the command conversion part and this makes it possible to construct the information network system which is simple in construction, inexpensive and convenient to use. And, because of the simpleness and easiness of this construction, there can be prepared the information network system whose software design and hardware design are easy.

In this case, the convenience of use is more enhanced if the command conversion table has stored previously therein the function commands corresponding to a plurality of functions of each of the plurality of functional appliances for each type and/or each maker of each of the plurality of functional appliances.

Also, the convenience of use is more enhanced if the command conversion table has stored previously therein the function commands corresponding to a plurality of functions of each of the plurality of the functional appliances that can be installed in the information network system.

Also, if the operation part is set as a concentration control operation part, since the concentration control operation part is only required to be one in number, the construction becomes simpler and easier to use.

And, in a case where the concentration control part is provided, the command conversion table has stored previously therein the commands corresponding to the operations of the concentration control operation part in correspondence with the function commands, it is possible to execute reliable desired functions in correspondence with such operations.

Also, in a case where the concentration control part is provided, the predetermined functional appliance switches the path of transfer of the data in correspondence with the function of the functional appliance selected by the concentration control operation part, and the respective functional appliances can be independently controlled using the concentration control part, whereby a desired function can be executed efficiently and reliably. It is to be noted that this switching of the path is performed by the switching operation of the relaying appliance.

Here, the predetermined functional appliance may switch the path of transfer of the data by a path command contained in the function command.

On the other hand, the plurality of functional appliances may each be also provided with a functional operation section, whereby direct operations with respect to the functional appliance become possible.

In a case where the functional operation section is provided to each functional appliance in this way, each of the plurality of functional appliances may produce the command in correspondence with the operation of its corresponding operation section and transmit to the predetermined functional appliance the path command associated with the changeover of the path of the data, and the predetermined functional appliance may switch the path of transfer of the data in correspondence with the path command.

In a case where the functional operation section is provided to each functional appliance, each of the plurality of relaying appliances may switch the path of transfer of the data in correspondence with the function of the functional appliance selected using its corresponding operation section.

BRIEF DESCRIPTION OF THE DRAWINGS

FIG. 2 is a view illustrating a command conversion table used in the information network system.

DETAILED DESCRIPTION OF THE PREFERRED EMBODIMENT

Figure 1:
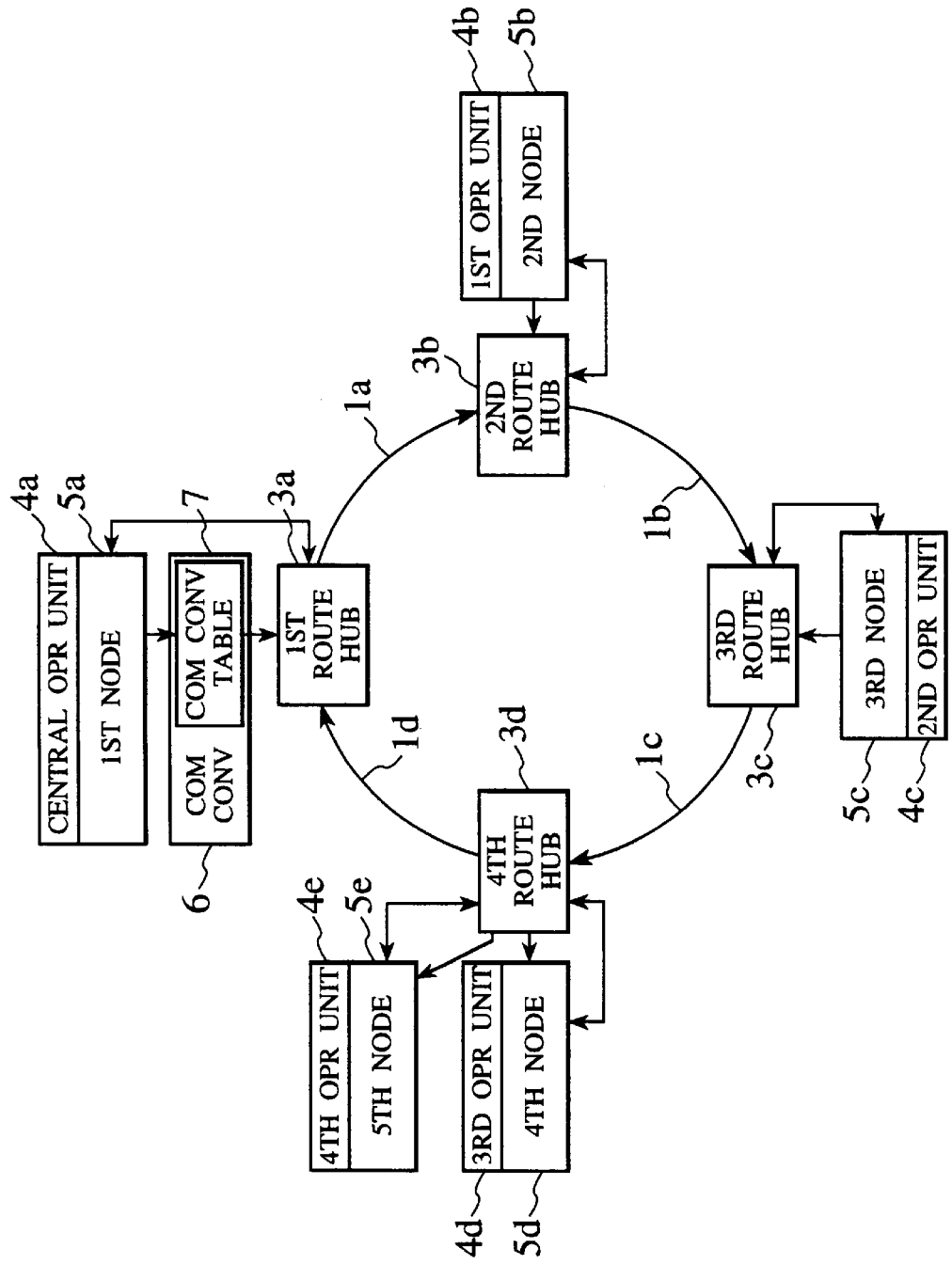
FIG. 1 is a constructional view illustrating an embodiment of an information network system according to the present invention.

An embodiment of the present invention will now be explained in detail while referring to the drawings if necessary.

FIG. 1 illustrates a construction of an information network system according to the embodiment.

In this information network system, a first route hub 3a to a fourth route hub 3d are connected to each other by a ring-like data transfer path arrangement which is constituted by data transfer paths 1a to 1d.

Mutual communications can be made between the route hubs 3a to 3d.

Specifically, if the data that has been received by each of the route hubs 3a to 3d is data directed to this receiving route hub itself or a functional appliance connected thereto, the receiving route hub takes in the data and, if the data that has been received by the route hub is data other than that directed to this receiving route hub itself or a functional appliance connected thereto, the receiving route hub sends this data to the next data transfer path as this data is.

On the other hand, if one of the route hubs 3a to 3d has data to be transmitted thereby, this route hub sends this transmission data to the immediately succeeding data transfer path.

Here, a first node 5a is connected to the first route hub 3a through a command conversion part 6.

And a second node 5b is connected to the second route hub 3b and a third node 5c is connected to the third route hub 3c.

Further, a fourth node 5d and a fifth node 5e are connected to the fourth route hub 3d.

More specifically, the first node 5a is HI and the second node 5b is CD.

And the third node 5c is DVD, the fourth node 5d is a monitor and the fifth node 5e is a speaker (including an amplifier).

The above-described HI can alternatively select one from among a plurality of functional appliances (CD, DVD, etc.) and can also alternatively select one function from among PLAY, STOP, etc. of the selected one of the CD, DVD, etc. and perform the selected function.

Further, the HI also functions as a system control unit (SCU) which performs a so-called "concentration management" with respect to the path arrangement of data transfer in the information network system.

Namely, the HI can also perform the concentration management over the path arrangement of the data transfer regarding the respective route hubs.

Meanwhile, the HI has a central control operation unit 4a for concentration operation and sends a HI command corresponding to the concentration operation of this central control operation unit 4a to the command conversion part 6.

The command conversion part 6 has a command conversion table 7.

And the command conversion table 7 has stored therein the HI commands transmitted thereto from the HI and the function commands corresponding to the function contents (PLAY, STOP, etc.) of the functional appliances (CD, DVD, etc.) determined in units of a maker, type, etc. in such a way that both correspond to each other.

Namely, the function commands are respectively set in units of a function according to a maker, type, etc. of the corresponding functional appliance. In the command conversion table 7, there are stored the function commands necessary for all compatible functional appliances predetermined to be mounted.

Further, in each function command, there is also contained a path command regarding the changeover of the path of the data transfer with respect to the corresponding functional appliance.

It is to be noted that in this embodiment it is assumed that the maker, type, etc. of each functional appliance be discriminated at the "on" time of the power according to this functional appliance that has been mounted.

Here, in FIG. 2 there is illustrated the contents of the command conversion table 7 according to this embodiment.

The command conversion table 7 representatively illustrated in FIG. 2 has stored previously therein the function commands such as PLAY command and STOP command for each one of A-type to C-type of CD and DVD.

For example, in a case where having selected the PLAY of the A-type CD, the HI command is the A-type CD PLAY and therefore the function command corresponding to the HI command is CP1.

Also, for example, in a case where having selected the STOP of the A-type DVD, the HI command is the A-type DVD STOP and therefore the function command corresponding to the HI command is DS1.

The command conversion part 6 having the command conversion table 7 can convert the HI command that has been transmitted from the HI to the function command by referring to the command conversion table 7 and send this function command to the first route hub 3a.

Next, the first route hub 3a can add address information that corresponds to the transmitting origin and destination to the received function command and send the resulting function command to the data transfer path 1a as the command information.

Subsequently, the second route hub 3b can add address information that corresponds to the transmitting origin and destination to the function command received from its own node 5b, i.e., CD and send the resulting function command to the data transfer path 1b as the command information while, on the other hand, the route hub 3b can remove the address information from the command information received from the data transfer path 1a and transmit the resulting function command to its own node 5b, i.e., CD. The same applies also to each of the route hubs 3c and 3d.

And the first route hub 3a can remove the address information from the command information received from the data transfer path 1d and transmit the resulting command information to its own node 5a, i.e., HI.

It is to be noted that a first functional operation unit 4b is provided to the CD constituting the second node 5b, a second functional operation unit 4c is provided to the DVD constituting the third node 5c, a third functional operation unit 4d is provided to the monitor constituting the fourth node 5d and a fourth functional operation unit 4e is provided to the speaker constituting the fifth node 5e.

The above-described functional operation units 4b to 4e are for the purpose of performing the manipulating operation for operating the respective functional appliances.

And the respective functional appliances can produce the function commands including the path commands in correspondence with the manipulating operation of their own functional operation units and transmit the path commands of these function commands which regard the changeover of the path of data transfer to the first node 5a, i.e., HI.

The HI which has received the above-described transmission can receive the path command and control the changeover of the path of data transfer passing through the route hubs 3a to 3d in correspondence with its received path command.

Namely, it can be also said that each of the route hubs 3a to 3d indirectly manages the path of its own data transfer in correspondence with the contents of the function of the corresponding functional appliance selected by its own functional operation unit.

Next, the operation of the above-described information network system according to this embodiment will be explained in detail by use of the following representative examples.

As a first example, an explanation will be given of the case where changeover is made of the path of data transfer through the operation performed from the central control operation unit 4a provided to the HI.

First, by manipulating the central control operation unit 4a, for example, the A-type DVD is selected and the PLAY is also selected, whereby the HI command that corresponds to this manipulating operation is input to the command conversion part 6.

The command conversion part 6 converts the HI command that has been transmitted thereto from the HI by referring to the command conversion table 7.

Specifically, as illustrated in FIG. 2, the command conversion part 6 converts the HI command (A-type DVD PLAY) to the function command (DP1).

In this case, there is the need to switch the path of data transfer to one which regards the PLAY of the A-type DVD. However, since the function command (DP1) contains the path command which regards the changeover of the path of data transfer, it is sufficient that the command conversion part 6 sends the function command (DP1) to the first route hub 3a.

Namely, the function command (DP1) including the path command will be sent to the first route hub 3a as is.

Subsequently, the first route hub 3a adds address information of the transmitting origin and destination to the function command (DP1) and sends the resulting function command (DP1) to the data transfer path 1a as the command information.

Subsequently, the third route hub 3c receives the command information sent from the data transfer paths 1a and 1b according to the address information and transmits this command information to the DVD after having removed the address information from this command information.

Accordingly, through the above-described operation, it is possible to PLAY the DVD reliably.

Simultaneously, since the first route hub 3a sends the path command of the function command (DP1) beforehand to the third route hub 3c and fourth route hub 3d, the path of transfer of the video and audio data of the DVD is already switched to this present path.

Accordingly, the video and audio data from the DVD are sent to the fourth route hub 3d through the third route hub 3c and then through the data transfer path 1c.

And the video data of the DVD is sent to the monitor and an image thereof is displayed while, on the other hand, the audio data of the DVD is sent to the speaker through the amplifier and is reproduced as a sound.

As a second example, an explanation will now be given of the case where the system is operated from the central control operation unit 4a and no changeover is made of the data path arrangement, for example, a case where in the first example the volume of the DVD is increased. In this case, the HI command from the HI is converted by the command conversion part 6 to the function command for increasing the volume, and this function command is sent to the speaker.

It is to be noted that in this case since the path command contained in the function command has no effect upon the changeover of the path of data transfer because the path of transferring the data to the speaker is already switched thereto.

As a third example, an explanation will now be given of the case where the system is operated from the functional operation unit other than the central control operation unit 4a and changeover is made of the data path.

First, for example, when in the second functional operation unit 4c operation is performed of the PLAY of the DVD constituting the third node 5c, the third node 5c sends to the third route hub 3c the function command of causing the reproduction of the DVD. It is to be noted that this function command contains the path command regarding the changeover of the data transfer regarding the PLAY of the DVD.

Subsequently, the third route hub 3c that has received the function command sends this function command to the HI through the data transfer path 1c, fourth route hub 3d, data transfer path 1d and first rout hub 3a.

Subsequently, since the first node 5a which is the HI that has the function of the system control unit (SCU) has the function of managing the path of data transfer, the first node 5a sends the path command contained in the function command to the third route hub 3c through the first route hub 3a, data transfer path 1a, second route hub 3b, and data transfer path 1b and further sends it to the fourth route hub 3d through the data transfer path 1c and thereby switches the path of the video and audio data of the DVD.

And the video and audio data of the DVD are sent to the fourth route hub 3d through the third route hub 3c and then through the data transfer path 1c, whereby the audio data of the DVD is sent to the speaker while, on the other hand, the video data of the DVD is sent to the monitor.

As a fourth example, in a case where the system is operated from the functional operation unit and no changeover is made of the data path, for example, in a case where in the third example the volume of the DVD is further increased, the function command for increasing the volume is sent from the DVD to the fourth route hub 3d through the third route hub 3c and this function command is transmitted to the speaker.

Although the above-described embodiment has been illustrated as a preferred example, the invention of course permits various modifications to be made according to specific aspects of design without departing from the technical idea of the invention.

For example, although in the above-described embodiment an explanation has been given of the case of a ring-like information network system prepared by connecting a plurality of functional appliance in the form of a ring by means of data transfer paths, the invention is sufficiently applicable also to a bus-type information network system prepared by connecting a plurality of functional appliances to one data transfer path or a star-type information network system prepared by connecting a functional appliance to each of a plurality of star-connected data transfer paths.

Also, although in the above-described embodiment an explanation has been given of the mode wherein in the command conversion table there are previously stored function commands in units of each one of all types of connectable and compatible functional appliances, if mountable functional appliances are more limited, only the function commands alone that correspond to such more limited functional appliances are previously stored and these function commands can be selected according to the manipulating operation of the HI.

Also, although in the above-described embodiment an explanation has been given, as the method of managing the paths of data transfer of the respective route hubs, of the so-called concentration management method executed via a HI, the method of managing may of course be executed also by an individual management method. In such an individual management method, since the data path is directly switched by each route hub according to its own determination, it becomes unnecessary to switch the path of data transfer through a HI, with the result that the construction becomes simpler and more convenient to use.

What is claimed is:

1. An information network system comprising:
a plurality of functional appliances each operated in response to a predetermined function command;
a plurality of relaying appliances, each associated with at least one of said plurality of functional appliances;
a data transfer path connecting said plurality of relaying appliances to each other and enabling said plurality of relaying appliances to communicate with each other;
an operation part associated with a predetermined one of said plurality of functional appliances, and provided in said predetermined one of said plurality of functional appliances to control each of said plurality of functional appliances by selecting a desired functional appliance from among said plurality of functional appliances and selecting a desired function from among a plurality of functions that can be performed by the functional appliance selected by said operation part, said operation part and said predetermined one of said plurality of functional appliances corresponding to a human interface; and
a command conversion part provided between said operation part of said predetermined functional appliance of said plurality of functional appliances and the relaying appliance corresponding to said predetermined functional appliance and having a command conversion table having stored therein a plurality of predefined function commands each of which corresponds to one of said plurality of functional appliances and a function associated with the one said functional appliance, each of said plurality of predefined function commands including a path command,
wherein each of said plurality of relaying appliances is configured to transmit data from a corresponding functional appliance to each of the other of said relaying appliances through said data transfer path and to receive data from a functional appliance other than that corresponding to said relaying appliance through said data transfer path;

wherein said command conversion part reads out a predefined function command corresponding to said functional appliance selected by use of said operation part and said function selected by use of said operation part, by referring to said command conversion table, said predefined function command being transmitted to the functional appliance to which the functional command corresponds by use of said path command included in said predefined function command and through one of said relaying appliances corresponding to said predetermined functional appliance, while setting a path of transfer of data sent to the functional appliance to which the functional command corresponds and that of transfer of data sent, from the functional appliance to which the functional command corresponds, to the functional appliance associated therewith;

wherein a command from one of said plurality of functional appliances other than said predetermined functional appliance is transmitted to said predetermined functional appliance through said one of said relaying appliance corresponding thereto, while setting a path of transfer of data sent, from the one of said plurality of functional appliances other than said predetermined functional appliance, to the functional appliance associated therewith.

2. An information network system according to claim 1, wherein said command conversion table stores therein function commands each of which corresponds to each of plurality of functions of each of said plurality of functional appliances for at least one of types and makers of said plurality of functional appliances.

3. An information network system according to claim 1, wherein said command conversion table stores therein function commands each of which corresponds to each of a plurality of functions of each of said plurality of functional appliances which can be installed in said system.

4. An information network system according to claim 1, wherein said operation part is a concentration control operation part.

5. An information network system according to claim 4, wherein said command conversion table has stored therein commands each of which corresponds to each of operations of said concentration control operation part in such a manner that each of said commands corresponds to each of said function commands.

6. An information network system according to claim 4, wherein said predetermined functional appliance switches a path of transfer of a data in correspondence with a function of a functional appliance selected by said concentration control operation part.

7. An information network system according to claim 6, wherein said predetermined functional appliance switches said path of transfer of data by said path command contained in one of said plurality of function commands which corresponds to a functional appliance selected by said concentration control operation part selected by said concentration control operation part and a function thereof.

8. An information network system according to claim 1, wherein with respect to each of the plurality of functional appliances, there is provided an operation section.

9. An information network system according to claim 8, wherein each of said plurality of functional appliances produces said command in correspondence with an operation by use of an operation section of said each of said plurality of functional appliances and transmits to said predetermined functional appliance a path command included in said command which is associated with a changeover of a path of transfer of data, and said predetermined functional appliance switches said path of transfer of a data in correspondence with said path command.

10. An information network system according to claim 8, wherein each of said plurality of relaying appliances switches said path of transfer of a data in correspondence with a function of a functional appliance selected using an operation section which corresponds to said each of said plurality of relaying appliances.

* * * * *